United States Patent
Yu et al.

(10) Patent No.: US 9,459,476 B2
(45) Date of Patent: Oct. 4, 2016

(54) LIQUID CRYSTAL DISPLAY DEVICE

(75) Inventors: Gang Yu, Shenzhen (CN); Jiaqiang Wang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 52 days.

(21) Appl. No.: 13/703,361

(22) PCT Filed: Aug. 29, 2012

(86) PCT No.: PCT/CN2012/080688
§ 371 (c)(1),
(2), (4) Date: Mar. 11, 2015

(87) PCT Pub. No.: WO2014/026404
PCT Pub. Date: Feb. 20, 2014

(65) Prior Publication Data
US 2015/0177553 A1    Jun. 25, 2015

(30) Foreign Application Priority Data
Aug. 15, 2012    (CN) .......................... 2012 1 0290564

(51) Int. Cl.
*G02F 1/1333*    (2006.01)
*G02F 1/1335*    (2006.01)

(52) U.S. Cl.
CPC .................. *G02F 1/133308* (2013.01); *G02F 2001/13332* (2013.01); *G02F 2001/133314* (2013.01); *G02F 2001/133317* (2013.01); *G02F 2201/46* (2013.01); *G02F 2201/503* (2013.01)

(58) Field of Classification Search
CPC ................... G02F 1/133308; G02F 1/133608; G02F 1/13452; G02F 1/133615; G02F 2001/133317; G02F 2201/503; G02F 1/133603; G02F 1/133604
USPC .............................................. 349/58, 60, 61
See application file for complete search history.

(56) References Cited

U.S. PATENT DOCUMENTS

2012/0242926 A1* 9/2012 Hsu ................... G02F 1/133308
                                                                349/58
2015/0219954 A1* 8/2015 Kubo ................ G02F 1/133308
                                                                348/794

FOREIGN PATENT DOCUMENTS

| CN | 101871596 A | 10/2010 |
| CN | 102034401 A | 4/2011 |
| CN | 202040696 U | 11/2011 |
| CN | 202361198 U | 8/2012 |
| TW | 200424667 | 11/2004 |

\* cited by examiner

Primary Examiner — Mike Qi
(74) *Attorney, Agent, or Firm* — Mark M. Friedman

(57) ABSTRACT

The present invention discloses a liquid crystal display device, the liquid crystal display device comprises a liquid crystal panel, a side board, a plastic housing, a front frame and a least one fastening unit. The plastic housing or the front frame is formed with a fastening hole, and a fastening block is provided and embedded into the fastening hole and fixed on the side board. Thus, the plastic housing or the front frame can be tightly installed on the side board. The assembly convenience can be increased, and the engagement relationship between components of the module also can be strengthened, so as to increase the structural strength of the module.

12 Claims, 7 Drawing Sheets

LIQUID CRYSTAL DISPLAY DEVICE

FIELD OF THE INVENTION

The present invention relates to a liquid crystal display device, and more particularly to a liquid crystal display device simplifying the component assembly of the module.

BACKGROUND OF THE INVENTION

Traditional thin film transistor liquid crystal display (TFT-LCD) comprises a backlight module, a liquid crystal display (LCD) panel, a plastic housing and a front frame, the backlight module comprises a metal back, a light guide plate (LGP), an optical film assembly and a light source, the LGP is installed in the metal back plate, the light source is installed on the metal back plate and beside the LGP, the optical film assembly is superposed on the LGP, the plastic housing is disposed on and surrounds the metal back plate, the LCD panel is installed on the plastic housing, the front frame is installed on the plastic housing to hold and position the LCD panel with the plastic housing for protecting it.

Referring to FIG. 1, a conventional liquid crystal display device is which disclosed, wherein the liquid crystal display device comprises a front frame 11, a plastic housing 12, a back plate 13, and a hook 14 extended outward from the back plate 13, the back plate 13 is engaged with the front frame 11 (plastic housing 12) by the hook 14 for surrounding the liquid crystal panel 15, so as to achieve the effect of protecting the LCD panel.

However, the engagement of the hook 14 causes the following technical issues: the front frame 11, the plastic housing 12 and the back plate 13 are engaged with each other by the hook 14, and the engagement relationship therebetween is not tight and easier to loose, resulting in reducing the strength of the module structure of the whole liquid crystal display device. Moreover, the structural strength of side plates of the back plate 13 is reduced after stamping the back plate 13 to form the hook 14. Furthermore, the hook 14 of the back plate 13 could be aligned with the front frame 11 and the plastic housing 12 to engage with each other, resulting in relatively increasing the process and operation time of assembling the liquid crystal display device.

Therefore, it is necessary to provide a liquid crystal display device, in order to solve the problems of the prior art.

SUMMARY OF THE INVENTION

In view of this, the present invention provides a liquid crystal display device, which is used to solve the problem of the traditional liquid crystal display device that has insufficient tight engagement relationship between the module components to reduce the structural strength thereof.

A primary object of the present invention is to provide a liquid crystal display device, wherein a front frame or a plastic housing only needs to form a fastening hole, and a fastening unit is provided to embed in the fastening hole of the front frame or the plastic housing and fix on a side board, such that the module assembly operation of the liquid crystal display device can be completed, so as to simplify the module structure and the manufacture process of the liquid crystal display device and to increase the structural strength of the module.

To achieve the above object, one embodiment of the present invention provides a liquid crystal display device which comprises: a liquid crystal panel; a side board surrounding the liquid crystal panel; a plastic housing comprising a body portion and an extension portion extended inward from the body portion, wherein the body portion is formed with at least one fastening hole, the extension portion is formed with a positioned groove, and the side board is extended into the positioned groove and abuts against the body portion; a front frame installed outside the side board and below the body portion of the plastic housing; at least one fastening unit embedded in the fastening hole of the plastic housing and fixed on the side board, so as to fix the plastic housing on the side board, wherein the fastening unit comprises a fastening block and a engagement piece extended from the fastening block, and the side board is formed with an engagement hole in which the engagement piece is engaged; and a back plate integrated with the side board.

Furthermore, another embodiment of the present invention provides a liquid crystal display device which comprises: a liquid crystal panel; a side board surrounding the liquid crystal panel; a plastic housing comprising a body portion and an extension portion extended inward from the body portion, wherein the body portion is formed with at least one fastening hole, the extension portion is formed with a positioned groove, and the side board is extended into the positioned groove and abuts against the body portion; a front frame installed outside the side board and below the body portion of the plastic housing; and at least one fastening unit embedded in the fastening hole of the plastic housing and fixed on the side board, so as to fix the plastic housing on the side board.

Moreover, further another embodiment of the present invention provides a liquid crystal display device which comprises: a liquid crystal panel; a side board surrounding the liquid crystal panel ; a plastic housing formed with a positioned groove, the side board extended into the positioned groove; a front frame installed outside the side board and the plastic housing, wherein the front frame is formed with at least one fastening hole; and at least one fastening unit embedded in the fastening hole of the front frame and fixed on the side board, so as to fix the front frame on the side board.

In one embodiment of the present invention, the fastening unit comprises a fastening block and a fastening adhesive formed on the fastening block to bond the fastening block on the side board.

In one embodiment of the present invention, the fastening unit comprises a fastening block and an engagement piece extended from the fastening block, and the side board is formed with an engagement hole in which the engagement piece is engaged.

In one embodiment of the present invention, the engagement piece is a pillar.

In one embodiment of the present invention, the liquid crystal display device further comprises a back plate integrated with the side board.

The above-mentioned content of the present invention can be best understood by referring to the following detailed description of the preferred embodiments and the accompanying drawings:

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

Figure 1:
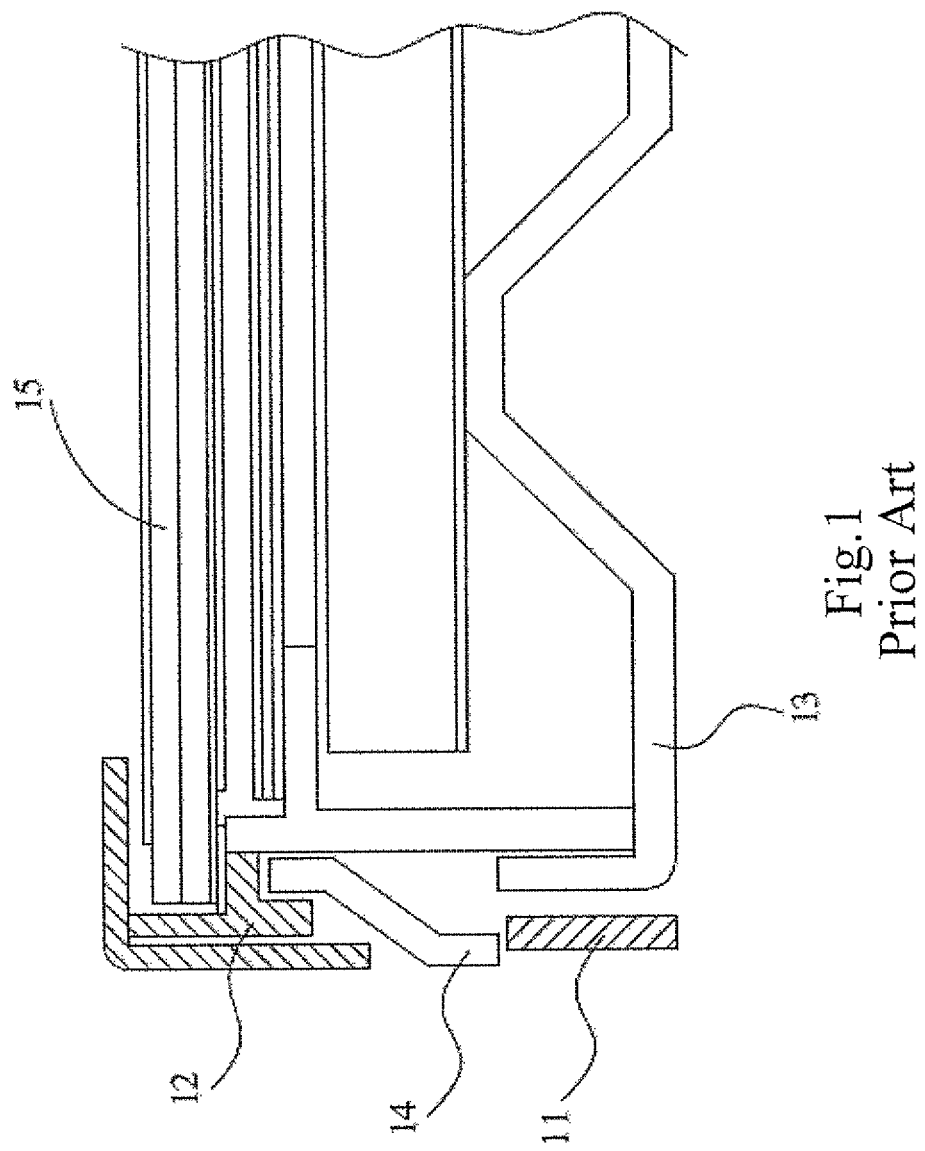
FIG. 1 is a schematic view of a traditional liquid crystal display device.
Figure 2:
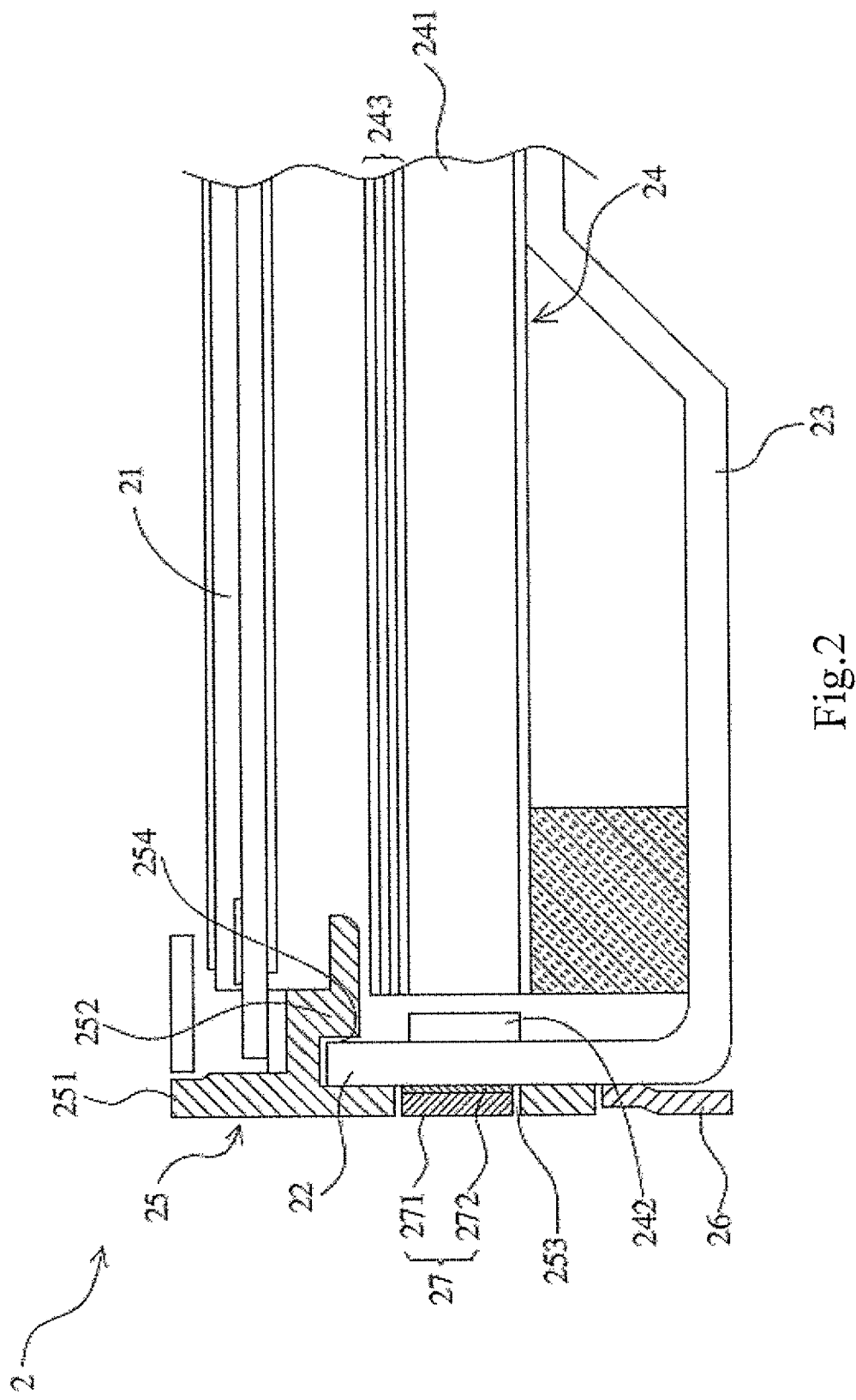
FIG. 2 is a schematic view of a liquid crystal display device according to a first embodiment of the present invention.

Referring to FIG. 2, a liquid crystal display device 2 according to a first embodiment of the present invention is illustrated, wherein the liquid crystal display device comprises a liquid crystal panel 21, a side board 22, a back plate 23, a backlight assembly 24, a plastic housing 25, a front frame 26 and a fastening unit 27.

In the embodiment, the side board 22 surrounds the liquid crystal panel 21, the back plate 23 is integrated with the side board 22. The backlight assembly 24 is a side-light type backlight assembly comprising a light guide plate 241, a light source 242 and an optical film assembly 243, wherein the light guide plate 241 is installed on the back plate 23, and the light source 242 is installed on the side board 22 and beside the light guide plate 241. Certainly, in the other embodiment, there are more than two light sources 242 installed on two sides, three sides or four sides of the light guide plate 241, but the present invention is not limited thereto. The backlight assembly 24, the back plate 23 and the side board 22 commonly construct a backlight module.

The plastic housing 25 comprises a body portion 251 and an extension portion 252 extended inward from the body portion 251, wherein the body portion 251 is formed with a fastening hole 253, the extension portion 252 is formed with a positioned groove 254, and the side board 22 is extended into the positioned groove 254 and abuts against the body portion 251. The liquid crystal panel 21 abuts against the extension portion 252, the front frame 26 is installed outside the side board 22 and under the body portion 251 of the plastic housing 25.

Figure 3:
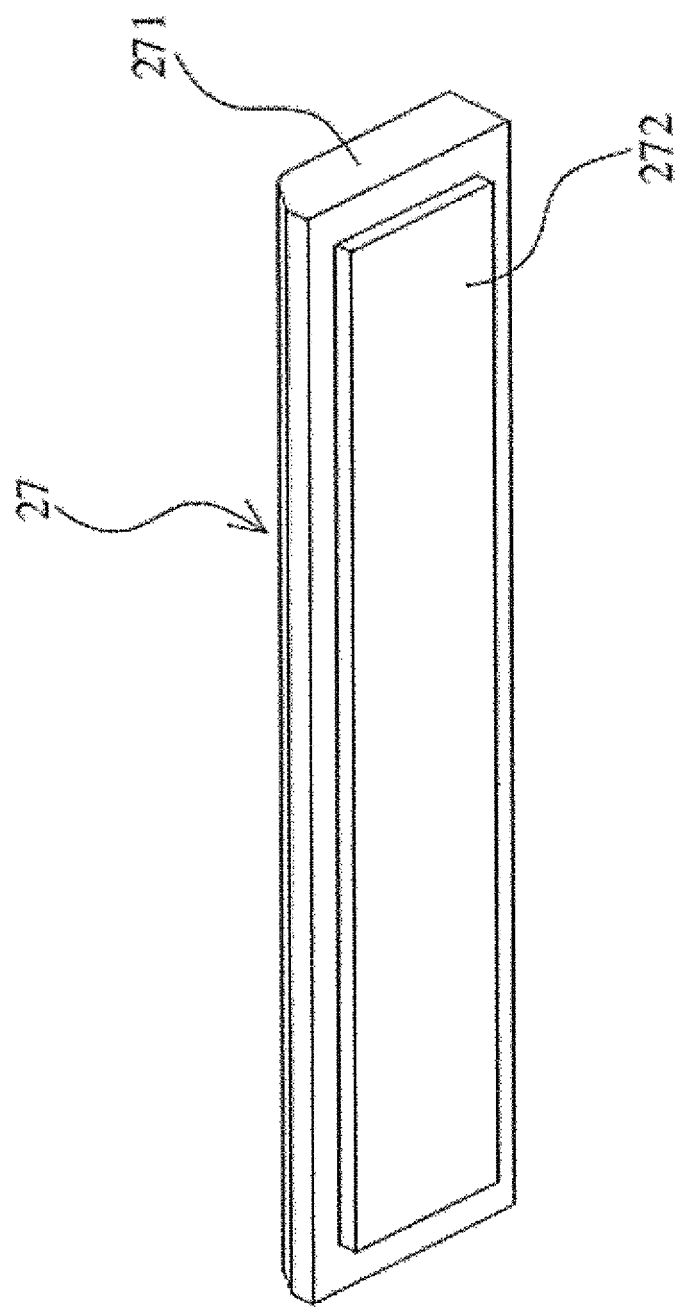
FIG. 3 is a schematic view of a fastening unit of FIG. 2.

Referring to FIGS. 2 and 3, the fastening unit 27 comprises: a fastening block 271 embedded in the fastening hole 253 of the plastic housing 25, and a fastening adhesive 272 formed on the fastening block 271 to bond the fastening block 271 on the side board 22, so as to fix the plastic housing 25 on the side board 22. It should be described that, in the embodiment, one fastening unit 27 is used to embed in one fastening hole 253, but, in other embodiment, it can install two or more than two fastening units 27 and fastening holes 253 to strengthen the overall stability. However, the present invention is not limited thereto.

Referring to FIG. 2 again, according to the present embodiment, the plastic housing 25 of the liquid crystal display device 2 is formed with the fastening hole 253 in which the fastening block 271 is embedded, the fastening block 271 is bonded on the side board 22 to combine the plastic housing 25 with the side board 22 tightly. Thus, the assembly convenience can be increased, and the engagement relationship between components of the module also can be strengthened, so as to increase the structural strength of the module.

Figure 4:
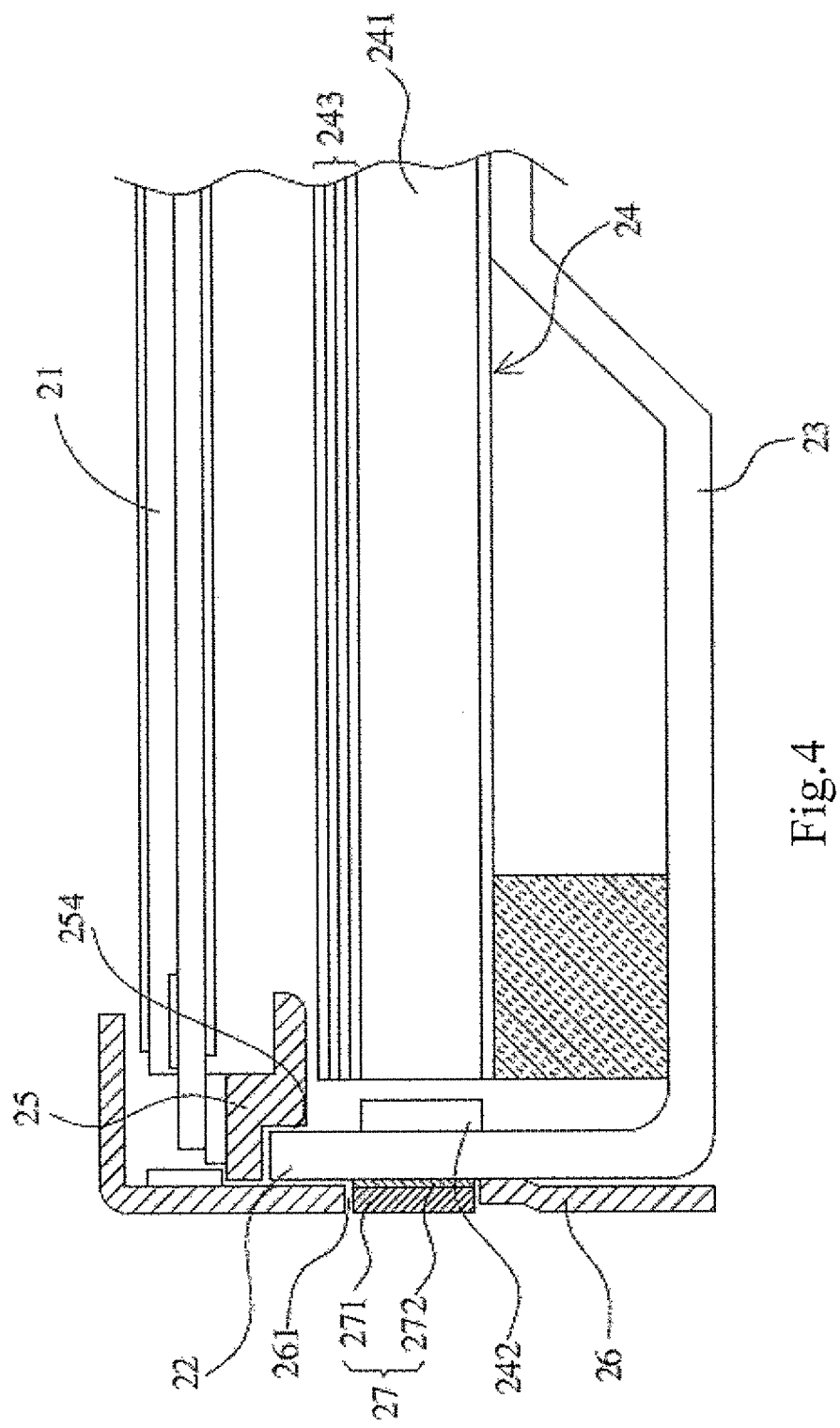
FIG. 4 is a schematic view of a liquid crystal display device according to a second embodiment of the present invention.

Referring to FIG. 4, a liquid crystal display device according to a second embodiment of the present invention is illustrated and similar to the first embodiment, so that the second embodiment uses similar terms or numerals of the first embodiment. As shown, the difference of the second embodiment is that the liquid crystal display device 2 comprises: a liquid crystal panel 21, a side board 22, a back plate 23, a backlight assembly 24, a plastic housing 25, a front frame 26 and a fastening unit 27.

The side board 22 surrounds the liquid crystal panel 21 and abuts against the liquid crystal panel 21, the plastic housing 25 is formed with a positioned groove 254, the side board 22 is extended into the positioned groove 254, the front frame 26 surrounds the side board 22 and the plastic housing 25, and the front frame 26 is formed with a fastening hole 261 on the same side of the side board 22 and the plastic frame 25.

The fastening unit 27 comprises: a fastening block 271 embedded in the fastening hole 261 of the front frame 26, and a fastening adhesive 272 formed on the fastening block 271 to bond the fastening block 271 on the side board 22, so as to fix the front frame 26 on the side board 22.

According to the present embodiment, the fastening block 271 is embedded in the fastening hole 261 and bonded on the side board 22 to combine the front frame 26 with the side board 22 tightly. Thus, the assembly convenience can be increased, and the engagement relationship between components of the module also can be strengthened, so as to increase the structural strength of the module. In the present embodiment, the front frame 26 surrounds the side board 22 and the plastic frame 25 to increase the connection of the module assembly.

Figure 5:
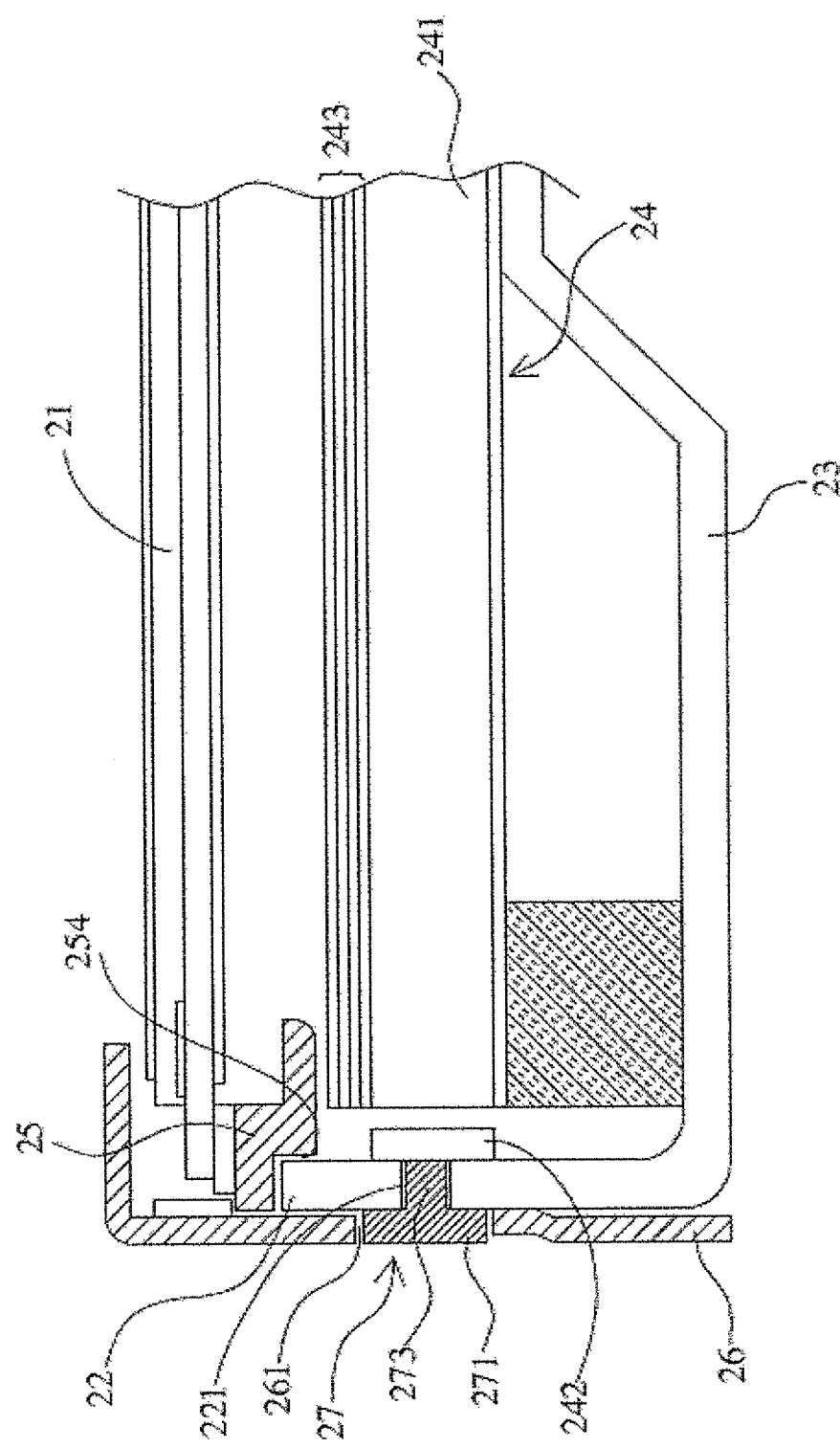
FIG. 5 is a schematic view of a liquid crystal display device according to a third embodiment of the present invention.

Referring to FIG. 5, a liquid crystal display device according to a third embodiment of the present invention is illustrated and similar to the second embodiment, so that the third embodiment uses similar terms or numerals of the first embodiment. As shown, the difference of the second embodiment is that the liquid crystal display device 2 comprises: a liquid crystal panel 21, a side board 22, a back plate 23, a backlight assembly 24, a plastic housing 25, a front frame 26 and a fastening unit 27.

The fastening unit 27 comprises: a fastening block 271 embedded in the fastening hole 261 of the front frame 26, and an engagement piece 273 extended from the fastening block 271, while the side board 22 is formed with an engagement hole 221 in which the engagement piece 273 is engaged, so as to combine the front frame 26 with the side board 22.

Figure 6A:
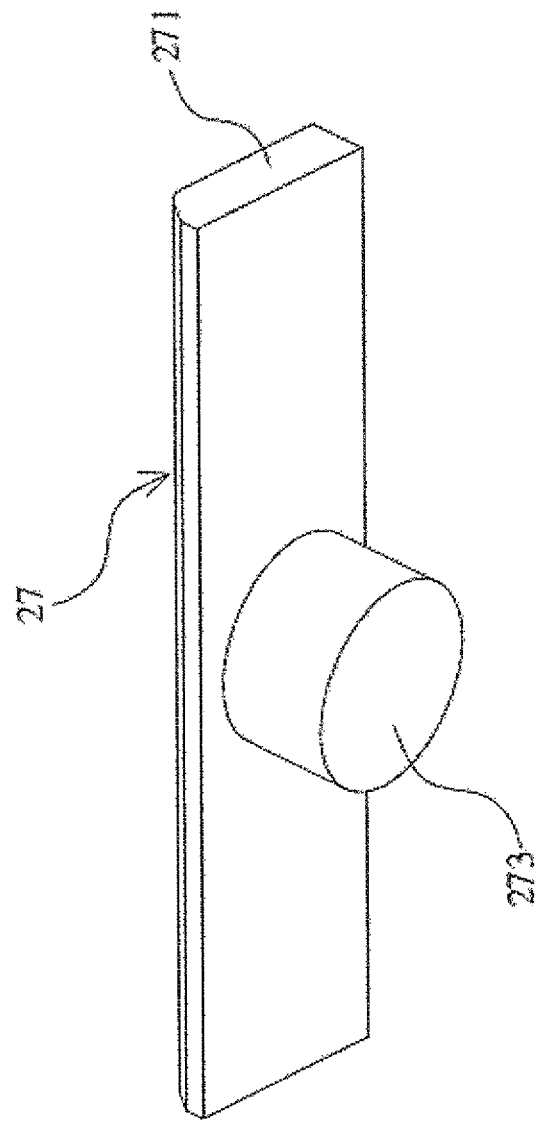
FIG. 6a is a schematic view of a fastening unit of FIG. 5.
Figure 6B:
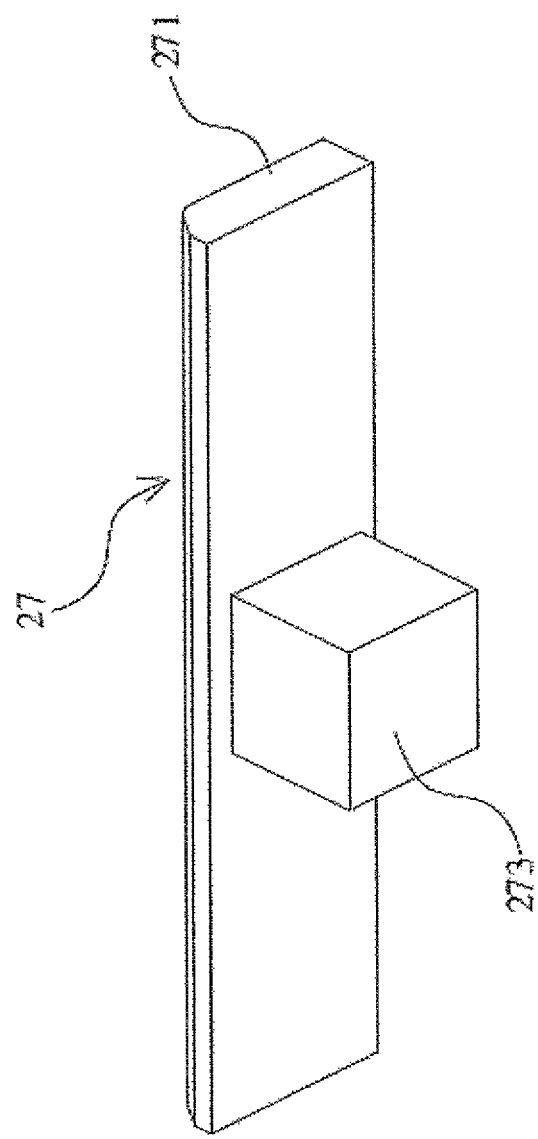
FIG. 6b is a schematic view of another fastening unit of FIG. 5.

Referring to FIGS. 5 and 6A, the engagement piece 271 is a circular pillar/column for engaging into the circular engagement hole 221. Certainly, as shown in FIG. 6A, the engagement piece 271 is also a rectangular pillar for engaging into the rectangular engagement hole 221. Additionally, in the first embodiment of the present invention, the liquid crystal display device 2 also can use the engagement connection of the engagement piece 273 and the engagement hole 221, but the present invention is not limited thereto.

According to the present embodiment, the fastening block 271 is embedded in the fastening hole 261 and engaged into the circular engagement hole 221, so as to combine the front frame 26 with the side board 22 tightly. Thus, the assembly convenience can be increased, and the engagement relationship between components of the module also can be strengthened, so as to increase the structural strength of the module. In the present embodiment,, the engagement connection of the engagement piece 273 and the engagement hole 221 can replace the adhesive connection to strengthen the assembly stability of the module.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A liquid crystal display device, comprising:
 a liquid crystal panel;
 a side board surrounding the liquid crystal panel;
 a plastic housing comprising a body portion and an extension portion extended inward from the body portion, wherein the body portion is formed with at least one fastening hole, the extension portion is formed with a positioned groove, and the side board is extended into the positioned groove and abuts against the body portion;
 a front frame installed outside the side board and below the body portion of the plastic housing;
 at least one fastening unit embedded in the fastening hole of the plastic housing and fixed on the side board, so as to fix the plastic housing on the side board, wherein the fastening unit comprises a fastening block and an engagement piece extended from the fastening block, and the side board is formed with an engagement hole in which the engagement piece is engaged; and
 a back plate integrated with the side board.

2. The liquid crystal display device according to claim 1, wherein the engagement piece is a pillar.

3. A liquid crystal display device, comprising:
 a liquid crystal panel;
 a side board surrounding the liquid crystal panel;
 a plastic housing comprising a body portion and an extension portion extended inward from the body portion, wherein the body portion is formed with at least one fastening hole, the extension portion is formed with a positioned groove, and the side board is extended into the positioned groove and abuts against the body portion;
 a front frame installed outside the side board and below the body portion of the plastic housing; and
 at least one fastening unit embedded in the fastening hole of the plastic housing and fixed on the side board, so as to fix the plastic housing on the side board.

4. The liquid crystal display device according to claim 3, wherein the fastening unit comprises a fastening block and a fastening adhesive formed on the fastening block to bond the fastening block on the side board.

5. The liquid crystal display device according to claim 3, wherein the fastening unit comprises a fastening block and an engagement piece extended from the fastening block, and the side board is formed with an engagement hole in which the engagement piece is engaged.

6. The liquid crystal display device according to claim 5, wherein the engagement piece is a pillar.

7. The liquid crystal display device according to claim 3, wherein the back plate is integrated with the side board.

8. A liquid crystal display device, comprising:
 a liquid crystal panel;
 a side board surrounding the liquid crystal panel ;
 a plastic housing formed with a positioned groove, the side board extended into the positioned groove;
 a front frame installed outside the side board and the plastic housing, wherein the front frame is formed with at least one fastening hole; and
 at least one fastening unit embedded in the fastening hole of the front frame and fixed on the side board, so as to fix the front frame on the side board.

9. The liquid crystal display device according to claim 8, wherein the fastening unit comprises a fastening block and a fastening adhesive formed on the fastening block to bond the fastening block on the side board.

10. The liquid crystal display device according to claim 8, wherein the fastening unit comprises a fastening block and an engagement piece extended from the fastening block, and the side board is formed with an engagement hole in which the engagement piece is engaged.

11. The liquid crystal display device according to claim 10, wherein the engagement piece is a pillar.

12. The liquid crystal display device according to claim 8, wherein the liquid crystal display device further comprises a back plate integrated with the side board.

\* \* \* \* \*